United States Patent Office 3,461,366
Patented Aug. 12, 1969

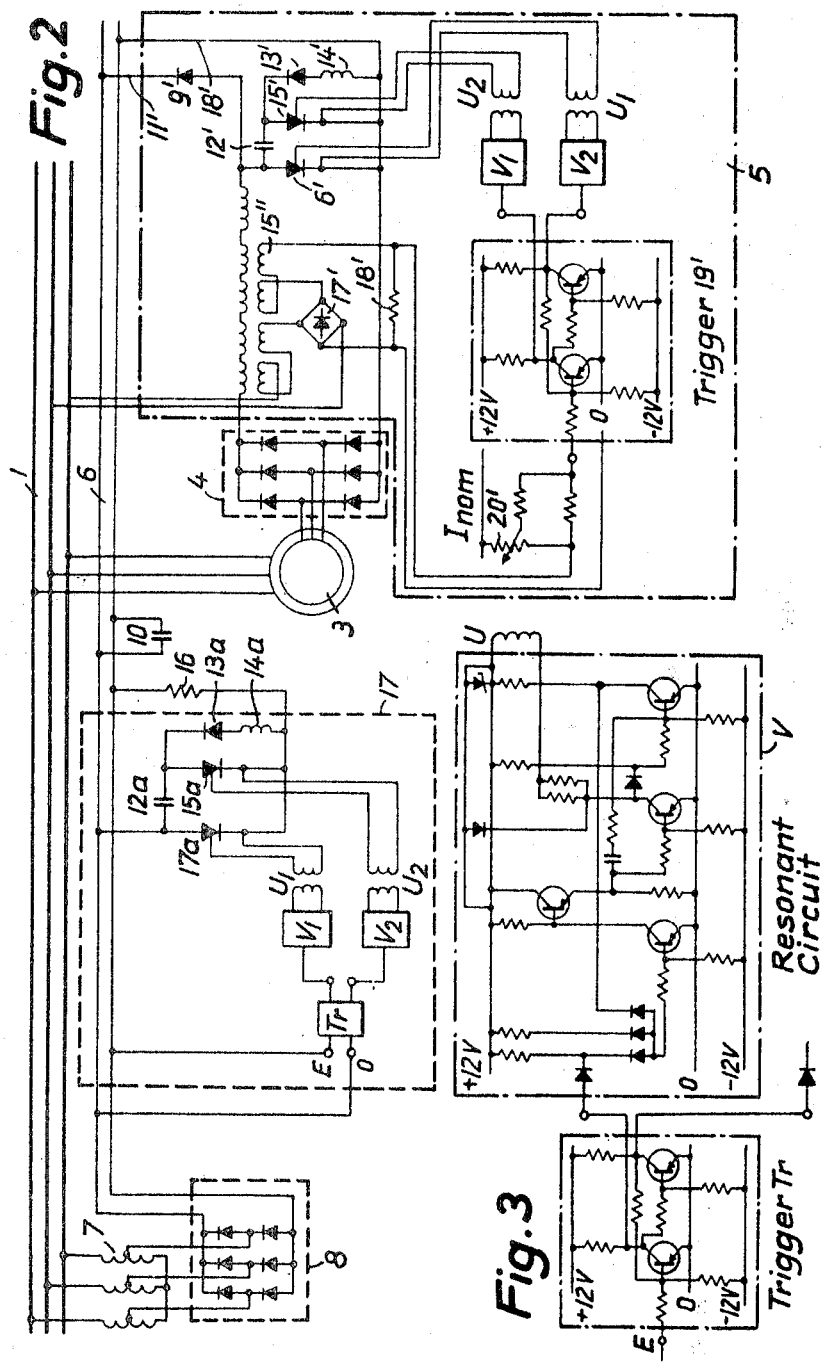

3,461,366
ELECTRICAL DISTRIBUTION AND CONTROL SYSTEM
Floris Koppelmann, Berlin-Siemensstadt, Germany, assignor to Licentia Patentverwaltungs G.m.b.H., Frankfurt am Main, Germany
Continuation-in-part of application Ser. No. 414,738, Nov. 30, 1964. This application Jan. 6, 1967, Ser. No. 617,743
Claims priority, application Germany, Nov. 29, 1963, L 46,454; July 28, 1964, L 48,394
Int. Cl. H02p 1/54, 5/46
U.S. Cl. 318—107        9 Claims

ABSTRACT OF THE DISCLOSURE

An A.C./D.C. electrical distribution and control system in which a regulated D.C. output voltage is derived from A.C. mains by means of a rectifier and a wound rotor induction motor connected in parallel between the A.C. mains and D.C. mains. The output of the wound rotor induction motor is rectified by a second rectifier and applied to the D.C. mains in a controlled manner so that the average D.C. power supplied by the motor is approximately equal to the load power drawn from the D.C. mains. A switchable ballast resistor is coupled across the D.C. mains to dissipate excess D.C. power. The ballast resistor is automatically switched into the circuit when the D.C. voltage exceeds a predetermined value.

Cross reference to related applications

This application is a continuation-in-part of copending application Ser. No. 414,738, now abandoned, filed Nov. 30, 1964.

Background of the invention

At the beginning of the development of the electromotive art, electric motors were first energized by direct current mains. After the invention of alternating current motors, however, existing direct current mains were progressively replaced by alternating current mains, but now there has been a reversal in this trend. Alternating current motors whose rotational speed is to be controlled once more require direct current mains, the latter preferably being used in conjunction with an alternating current main. This is particularly true where the power supply is to be used to supply a plurality of medium horsepower motors whose rotational speeds are to be controlled independently of each other.

The above-noted increase in the use of D.C. mains is principally due to the increasing use of thyristors, i.e., solid state gatable rectifiers, as motor speed control devices which, in turn, require controlled D.C. mains.

It is, therefore, the primary object of the present invention to provide an electrical distribution system in which both alternating and direct current mains are used for supplying electric energy to motors whose speeds are to be regulated independently of each other.

Summary of the invention

The present invention resides, basically, in an electrical distribution system which comprises regulated polyphase alternating current mains and wound rotor induction motors, i.e., motors having slip-ring rotors, energized from the alternating current mains, these motors giving off their rotary energy, via direct current pulse converter means, to direct current mains. Load means are connected to the direct current mains. The wound rotor induction motors which are connected between the alternating current mains and the direct current mains are so controlled that the average power supplied to the direct current mains from the rotor means is equal to the power drawn by the direct current load means. The invention further comprises a full-wave rectifier connected between the alternating current mains and the direct current mains, a switchable ballast resistor connected across the direct current mains, and means for electronically switching the ballast resistor to and from the direct current mains so that if excess power is fed to the direct current mains, the same is dissipated by the ballast resistor, while if there is an excess of power drawn from the direct current mains, the rectifier supplies the additional power.

Brief description of the drawings

FIGURE 2 is a schematic diagram of several of the circuits disclosed in block form in FIGURE 1.
FIGURE 3 is a schematic diagram of several of the circuits disclosed in block form in FIGURE 2.

Description of the preferred embodiments

Figure 1:
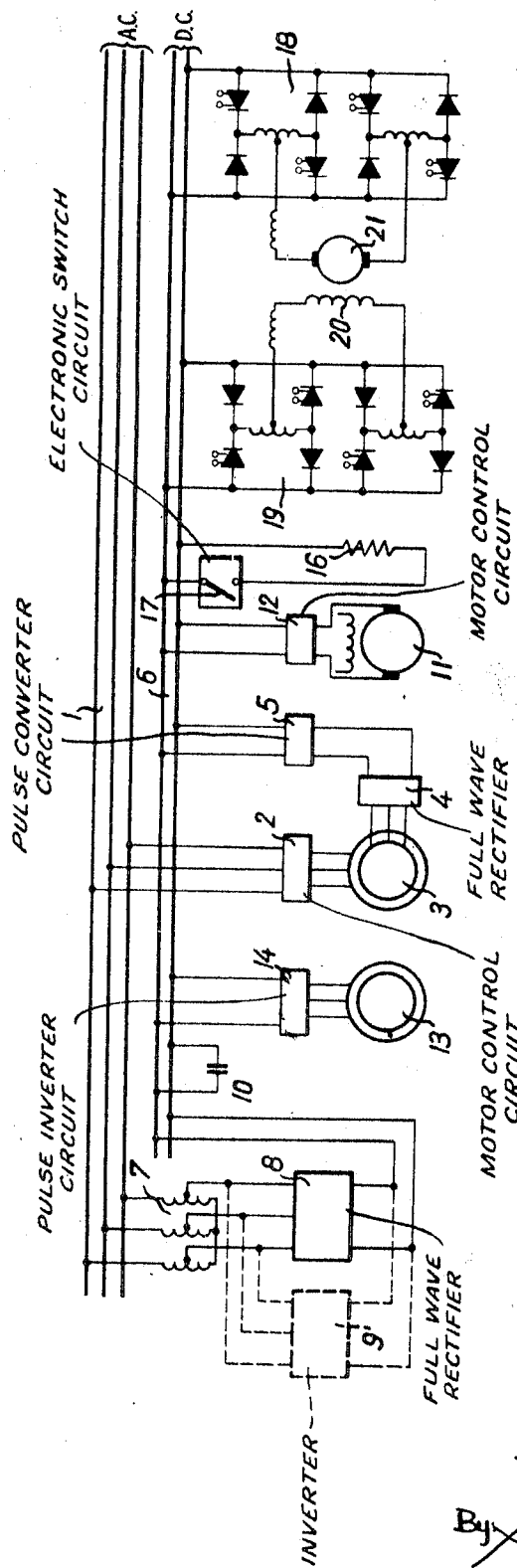
FIGURE 1 is a block diagram of one illustrative embodiment of the invention.

Referring now to the drawings, FIGURE 1 shows polyphase alternating current mains 1 which are connected, via a control circuit 2 incorporating reversing and braking thyristors, to an asynchronous electric motor 3. The rotor energy of the motor 3 is taken off by means of slip rings and, via an uncontrolled rotor rectifier 4 and a pulse converter 5 and is applied to direct current mains 6.

In a practical embodiment, a plurality of such arrangements 3, 4, 5, as described above, will be connected between the alternating current mains and the direct current mains. The direct current mains can, for example, draw the major portion of their energy from the alternating current mains 1 via a transformer 7 and a full-wave rectifier 8. If desired, a full-wave inverter 9 can be connected in parallel with the rectifier 8 if direct current energy is to be fed back into the alternating current mains. A capacitor 10 is connected across the direct current mains.

One load connected solely to the direct current mains is shown as being a direct current motor 11, together with its starter or control circuit 12. Another direct current load is shown as being a short-circuit rotor motor 13 which has its energy supplied to it via a pulse inverter 14.

In order to increase the reliability of the system, an auxiliary load or ballast resistor 16 is connected across the direct current mains 6 via an electronic switching circuit 17, which automatically switches ballast resistor 16 into the circuit when the D.C. voltage between conductors 6 exceeds a predetermined voltage.

Also shown are two single-phase pulse converters 18 and 19 which are energized by the direct current mains. The pulse converter 18 is connected across the armature of a direct current motor 21, while the pulse converter 19 is connected across the shunt field winding 20 of the motor. The circuitry 18, 19, 20, 21, can be used to replace a Ward-Leonard set, this being done by using quiescent electronic inverters. As a result, the efficiency of the system is increased as compared to conventional Ward-Leonard converters.

It will be seen from the above, that, according to the present invention, the electrical distribution system comprises both alternating current mains of constant voltage as well as direct current mains of constant voltage. The wound rotor induction motor means, of which only one example 3 is shown, have a stator which is energized from the alternating current mains, while the rotors apply their rotor energy, via respective direct current pulse converter means 5, to the direct current mains. The load means are connected to the direct current mains. The wound rotor induction motor means are so controlled that the average power supplied to the direct current mains from the rotors of the motors is approximately equal to the power drawn by the direct current load means. The full-wave rectifier 8 also applies direct current energy from the alternating current mains to the direct current mains. The resistor 16 is connected to the direct current mains, while the electronic switching means 17 serves for switching ballast resistor 16 to and from the direct current mains so that if an excess of power is fed to the direct current mains, the same is dissipated by the ballast resistor, while if there is an excess of power drawn from the direct current mains, the rectifier 8 supplies the additional power.

Thus, the present invention is based on feeding a plurality of loads from the alternating and direct current mains. The arrangement is such that the alternating current mains have asynchronous motors connected to them which, in a cascade circuit, feed a portion of the alternating current energy into the direct current mains, the latter energizing so many loads that the power taken from the direct current mains is equal to or greater than the power applied thereto via the asynchronous motors. The loads connected to the direct current mains are primarily direct current motors or asynchronous motors which are fed via self-controlled inverters.

The above-described ballast resistor circuit is provided in order to increase the reliability of the system as a whole. The electronic switching circuit 17 operates to switch in the ballast load resistor when the electrical energy flowing into the direct current mains via the asynchronous motors is greater than the instantaneous power drawn by the loads connected to the direct current mains.

In practice, the purpose of the capacitor 10 connected across the direct current mains 6 is provided in order to filter out ripple and current pulses.

FIGURES 2 and 3 show portions of the above-described embodiment in greater detail. Referring to FIGURE 2, the polyphase (three-phase) line 1 is connected to asynchronous motor 3. The energy is taken off the rotor 3 via slip rings and fed to the D.C. net via an uncontrolled rotary rectifier 4 with the aid of the conventional pulse transformer 5.

The pulse transformer 5, shown within the phantom lines, incorporates a gatable semiconductor rectifier element 6', which periodically short-circuits the output of the rectifier 4 or which feeds the rectifier output into the D.C. net 6 via the diode 9' and the line 11'. The element 6' is positively commutated by means of the turn-off circuit which incorporates the turn-off capacitor 12', a resonant circuit comprising the diode 13' and the choke 14', as well as the turn-off thyristor 15' which, upon firing, releases the energy stored in the capacitor for interrupting the current flow in the controllable semiconductor element 6'. For controlling these two rectifiers, the rotor current of the asynchronous motor 3 is reproduced in the load by means of a D.C. transformer 15" of a rectifier bridge 17' and is compared at the input of the trigger 19' with a nominal current I now derived from a potentiometer 20'.

The outputs of the trigger 19' are applied to the firing circuits $V_1$, $V_2$ and, via transformer $U_2$, $U_1$, serve as output values for producing the firing voltages for the semiconductor elements 6', 15', respectively.

The details of the resonant circuits $V_1$, $V_2$ are shown in FIGURE 3.

The ballast resistor 16 has asociated with it the controlled semiconductor element 17a, and the commutating circuit consisting of the commutating capacitor 12a, the resonant circuit comprising elements 13a, 14a, and the turn-off thyristor 15a. The pulses controlling the resistor 16 are applied via the transformers $U_1$, $U_2$, the same being connected to resonant circuits $V_1$, $V_2$ and a trigger $Tr$. The inputs to the trigger, E and O, are taken directly from the D.C. bus bars, and they produce the following operation: if the voltage across the rotor of the asynchronous motor 3 is too large, that is to say, if the voltage exceeds a nominal value equal to the response threshold of the trigger, the ballast resistor 16 is connected in parallel with the D.C. net. This will occur whenever the power output coming from the asynchronous motor 3 is greater than the power drawn by the D.C. load connected to the D.C. net. Since the semiconductor rectifier is an electronic switch capable of operating nearly at the speed of light, it can bridge power peaks.

The operation of the turn-off circuits for the rectifiers 6' and 17a is described in GE Manual 1962, 2nd edition, the D.C. converter being described in AEG-Mitteilungen, 1959, pages 606 to 609.

The particular advantage of the present invention is that the cascade allows the asynchronous machines to operate very simply and in a stable manner in all four quadrants of the speed-torque graph. This requires direct current mains which can readily operate in conjunction with alternating current mains.

By virtue of the fact that the direct current mains are energized from the alternating current mains via a rectifier, there is obtained the additional advantage that the rectifier need not be designed to supply the power which is continuously drawn by the loads connected to the direct current mains, inasmuch as part of the energy for the direct current mains comes directly from the alternating current mains via the asynchronous machines.

Finally, the present invention has been found to operate at a higher efficiency than heretofore known conventional semiconductor control circuits. The circuit is not limited by the characteristics of a current controlled inverter; there are no circulating currents; and the circuit as a whole uses less expensive rectifying means.

It will be understood that the above description of the present invention is susceptible to various modifications, changes, and adaptations, and the same are intended to be comprehended within the meaning and range of equivalents of the appended claims.

I claim:
1. An electric energy distribution system comprising, in combination:
   (a) means forming alternating current mains of constant voltage;
   (b) means forming direct current mains of constant voltage;
   (c) wound rotor induction motor means connected to said alternating current mains for drawing energy therefrom, said motor means having rotor means;
   (d) means interconnecting said rotor means of said motor means and said direct current mains to enable the rotor energy to be applied to said direct current mains;
   (e) load means connected to said direct current mains;
   (f) said motor means being distributed between said alternating and direct current mains such that the average power supplied to said direct current mains from said rotor means is equal to the power drawn by said load means;
   (g) rectifier means for energizing said direct current mains from said alternating current mains;
   (h) resistance means; and
   (i) electronic switching means for rapidly switching said resistance to and from said direct current mains such that if there is an excess of power fed to said direct current mains, the same is drawn by said resistor means while if there is an excess of power drawn by said direct current mains, said rectifier means supplies the additional power.

2. The combination defined in claim 1 wherein said rectifier means comprise a full-wave rectifier.

3. The combination defined in claim 1 wherein said means (d) comprise direct current pulse converter means.

4. The combination defined in claim 1 wherein said load means include a cage rotor motor which is connected to said direct current mains via inverter means.

5. The combination defined in claim 1 wherein said load means include a short-circuit rotor motor which is connected to said direct current mains via self-controlled pulse inverter means.

6. The combination defined in claim 1 wherein said load means include a direct current motor having an armature and a shunt field, a first pulse converter connected across said direct current mains and to said armature, and a second pulse converter connected across said direct current mains and to said shunt.

7. The combination defined in claim 1 wherein said direct current mains include two lines and a capacitor connected across said two lines.

8. The combination defined in claim 1, further comprising a full-wave inverter connected between said alternating and direct current mains for feeding energy back from said direct current mains to said alternating current mains.

9. An electric energy supplying system which comprises: polyphase alternating current mains of constant voltage; direct current mains of constant voltage; wound rotor induction motor means energized from said alternating current mains, said motor means having rotor means which give off their rotor energy, via direct current pulse converter means, to said direct current mains; load means connected to said direct current mains; said wound rotor induction motor means being so distributed between said two current mains that the average power supplied to said direct current mains from said rotor means is equal to the power of the direct current load means; a full-wave rectifier connected between said two current mains for feeding said direct current mains from said alternating current mains; resistance means connected to said direct current mains; and means for switching said resistance means electronically quickly to and from said direct current mains, the switching in and out of said resistance means being so regulated that if there is an excess of power fed to the direct current mains, the same is drawn by said resistance means, while if there is an excess of power drawn by said direct current mains, said rectifier supplies the additional power.

References Cited
UNITED STATES PATENTS

| | | | |
|---|---|---|---|
| 1,915,074 | 6/1933 | Stone | 307—26 X |
| 3,136,937 | 6/1964 | Miljanic | 318—197 |
| 3,227,937 | 1/1966 | Koppelmann et al. | 318—237 |
| 3,329,877 | 7/1967 | Shibata | 318—197 X |

ORIS L. RADER, Primary Examiner

ALFRED G. COLLINS, Assistant Examiner

U.S. Cl. X.R.

307—26, 82